Jan. 2, 1945.  E. L. PERRY  2,366,212
APPARATUS FOR FORMING HOLLOW ARTICLES
Filed Jan. 2, 1941  7 Sheets-Sheet 1
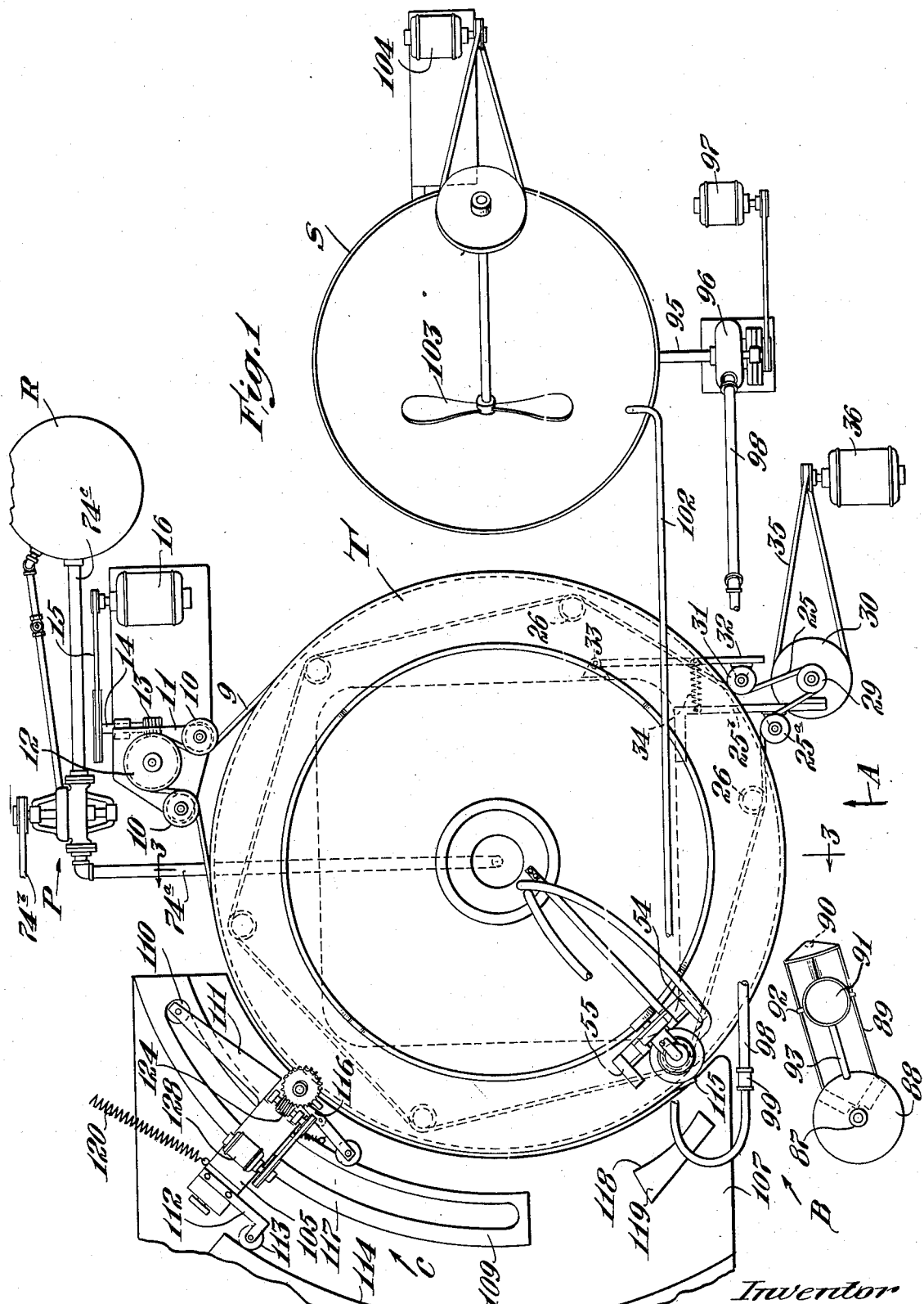
Inventor
Eugene L. Perry
by Roberts Cushman Woodbury
Att'ys

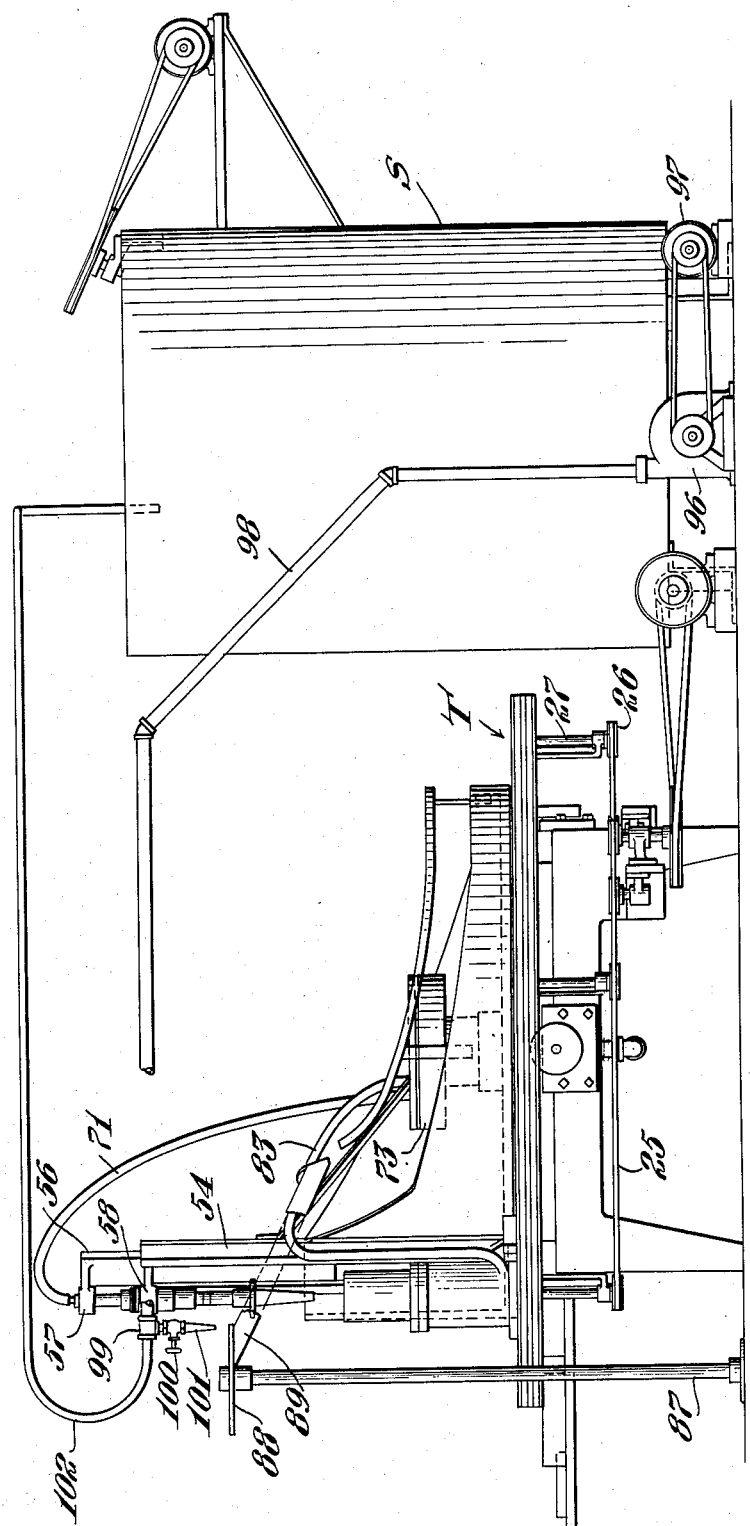

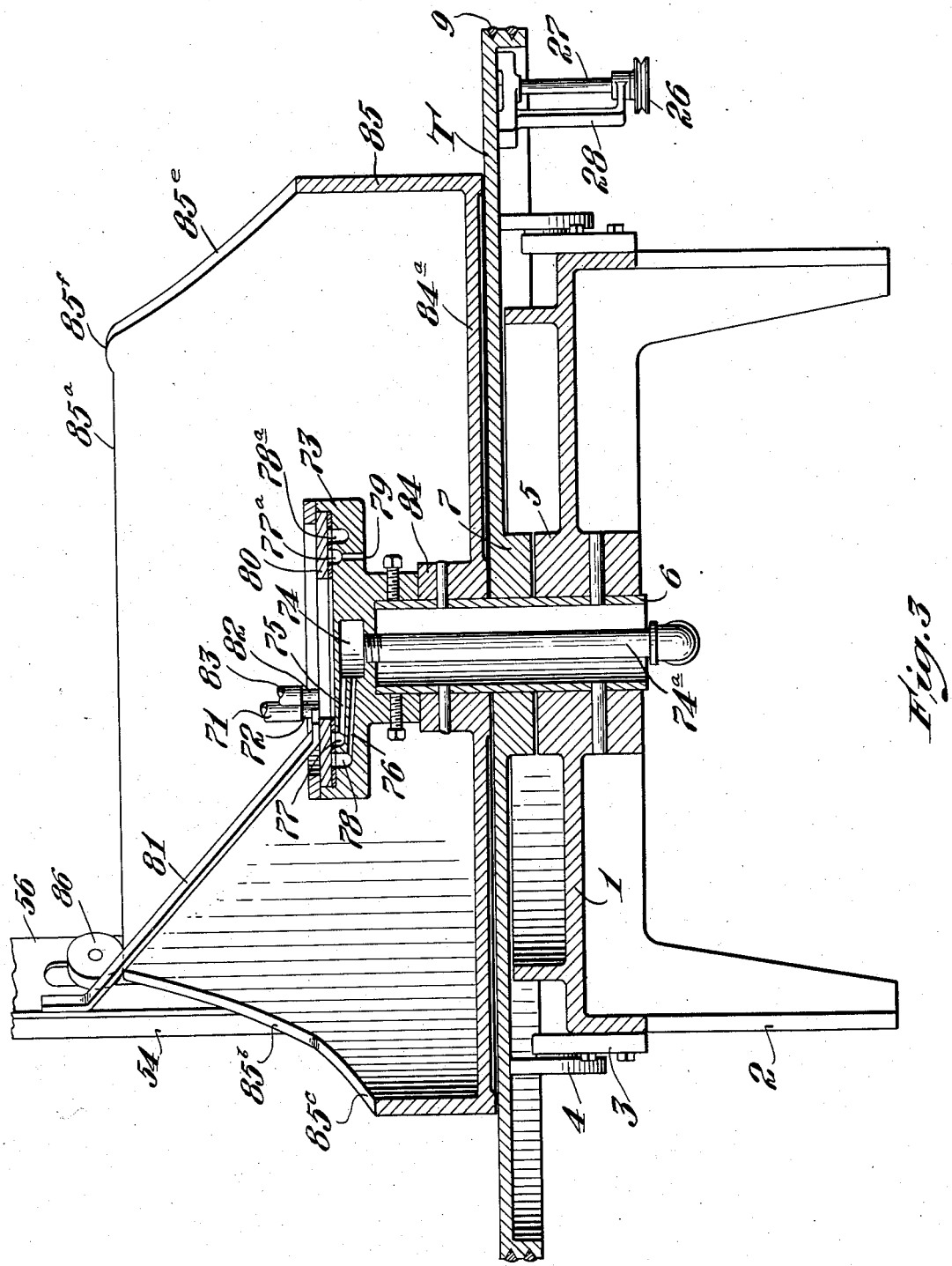

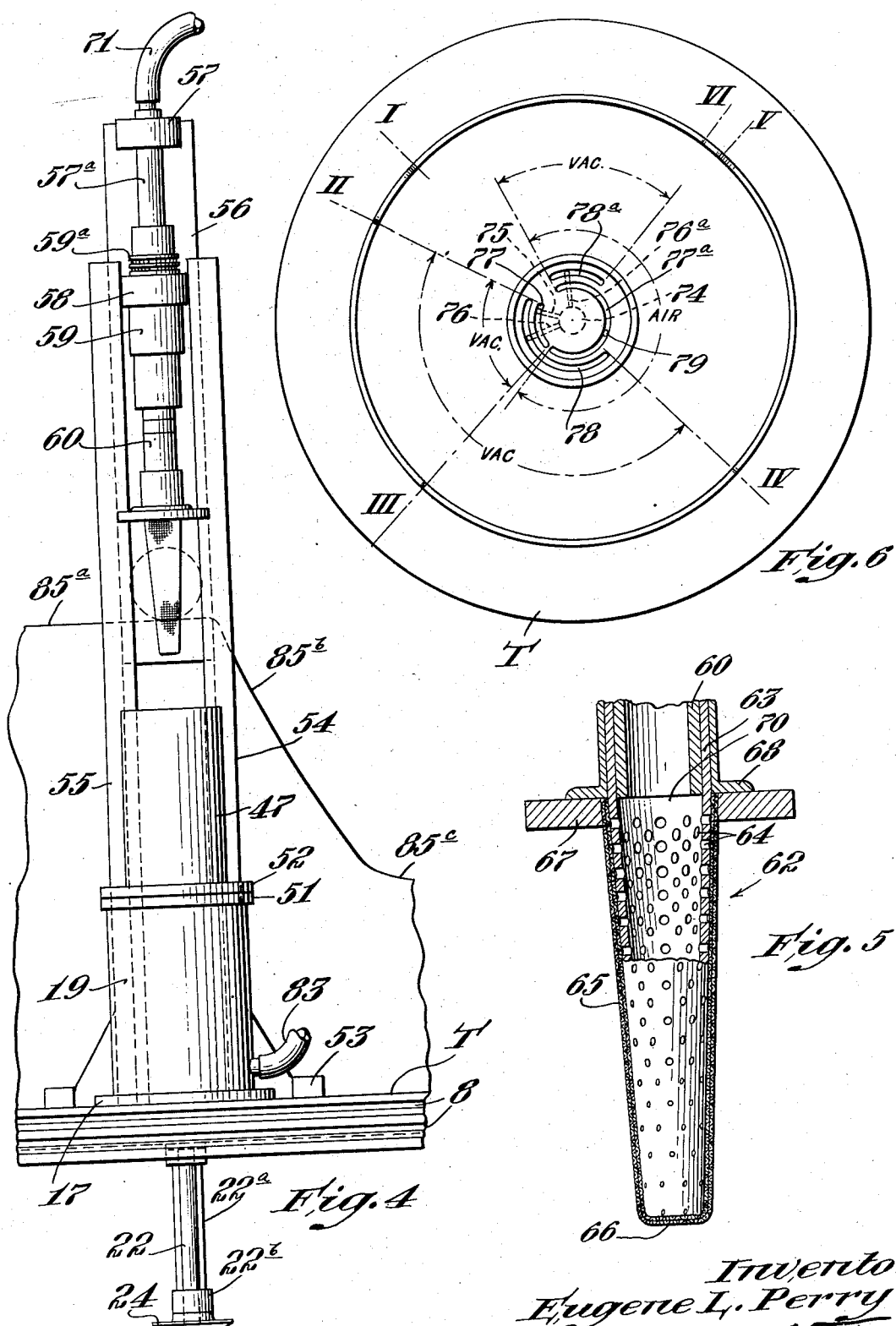

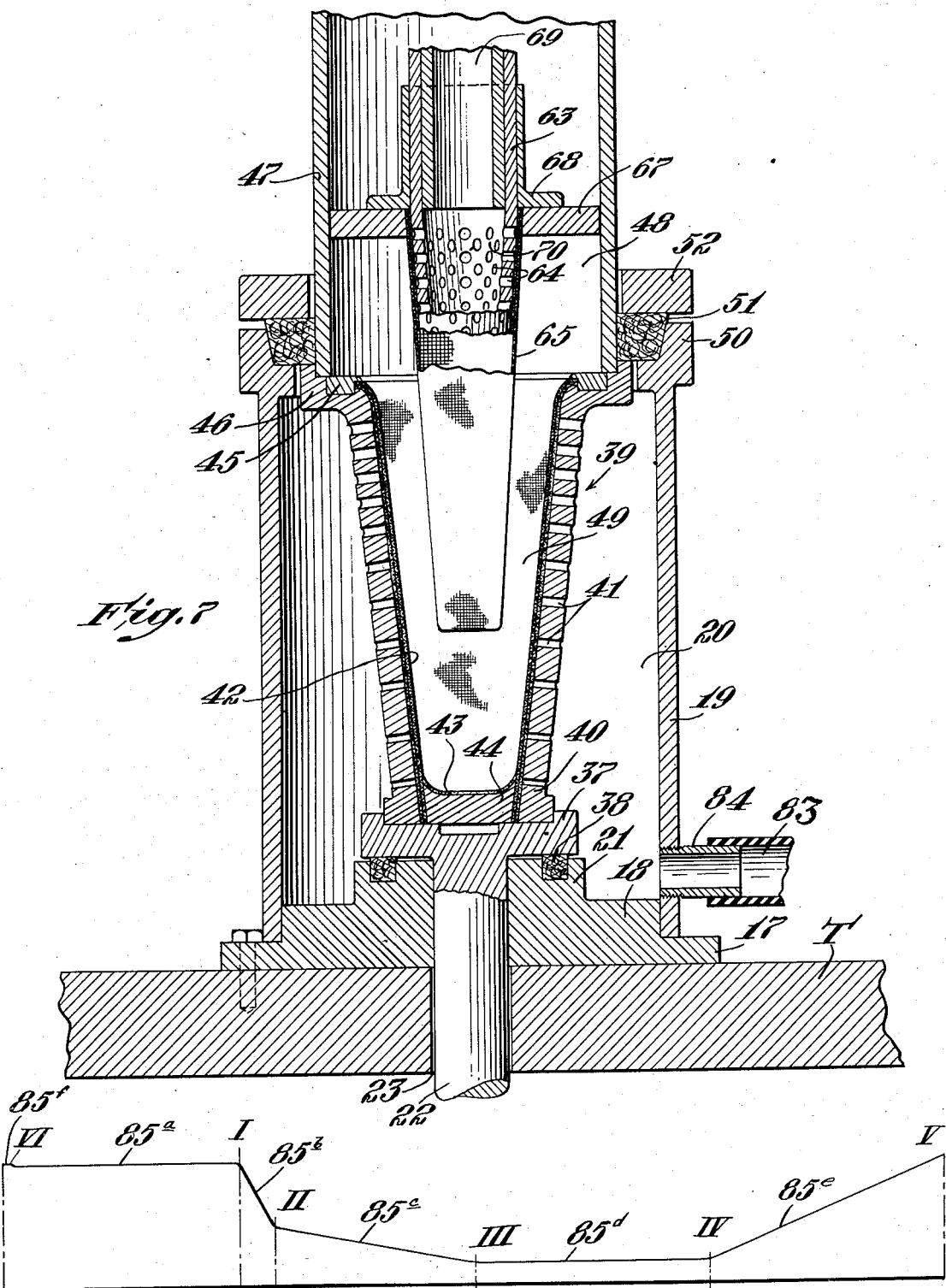

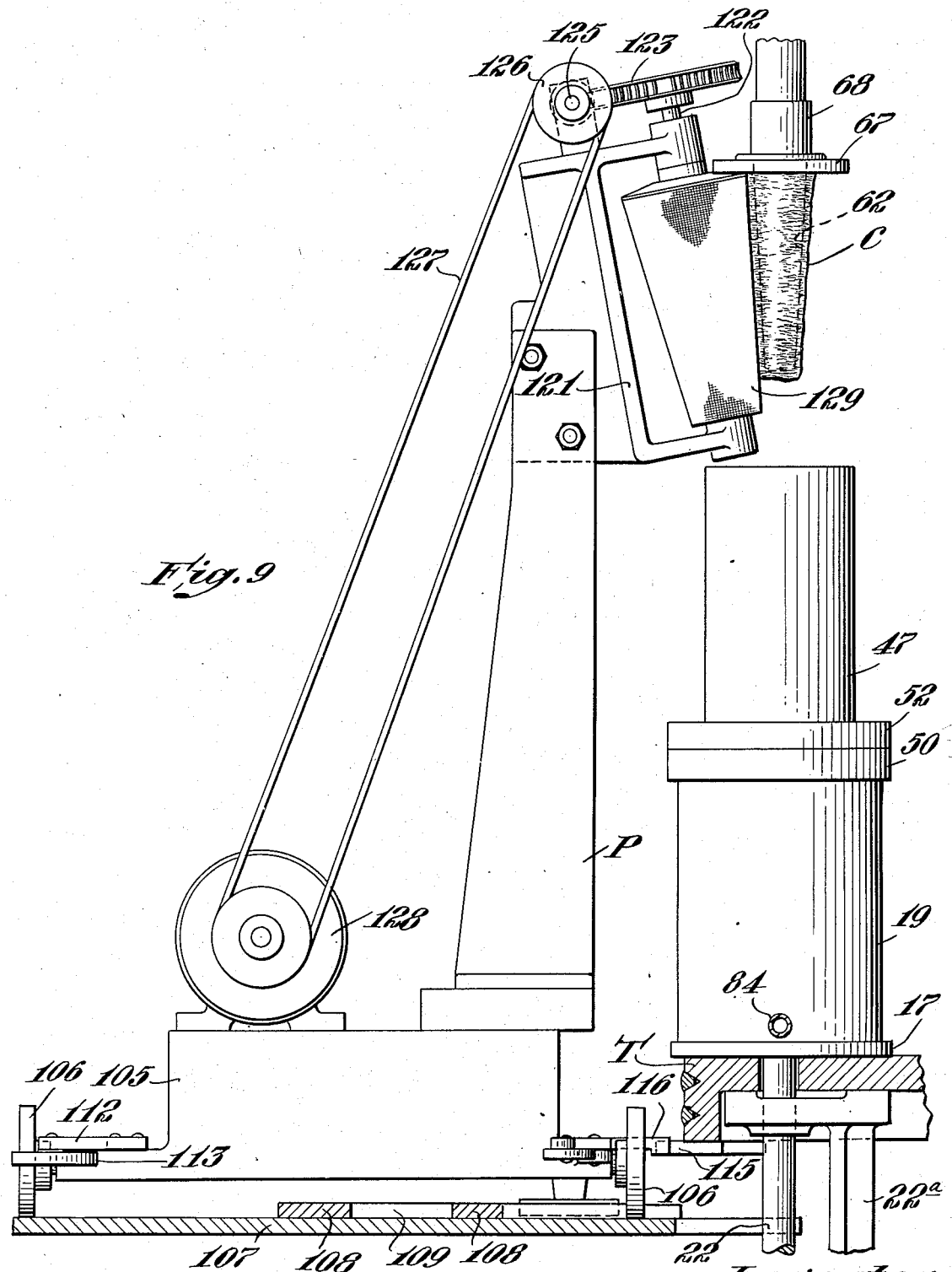

Jan. 2, 1945. E. L. PERRY 2,366,212
APPARATUS FOR FORMING HOLLOW ARTICLES
Filed Jan. 2, 1941 7 Sheets-Sheet 7
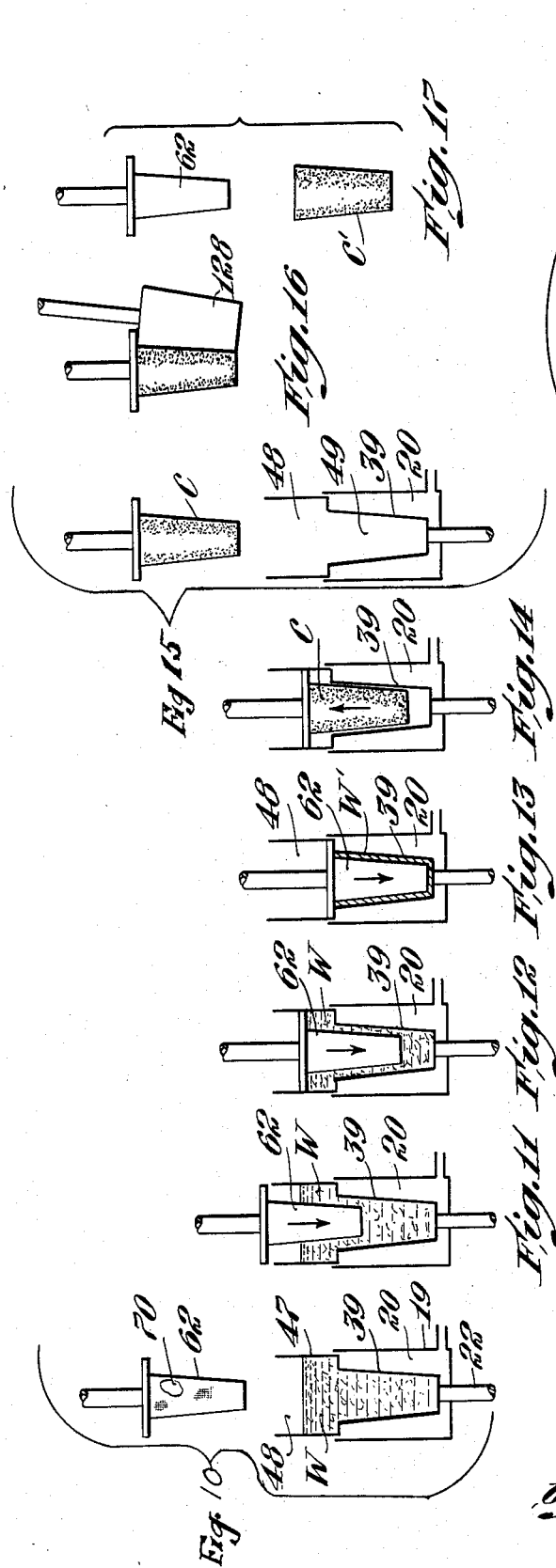
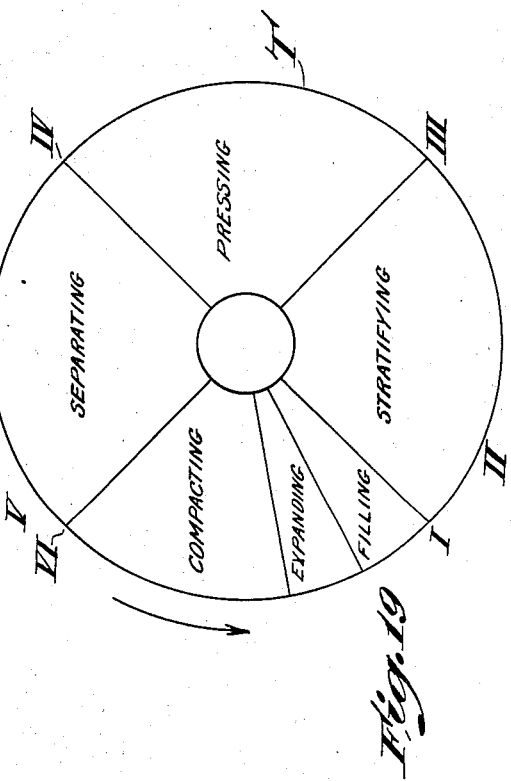
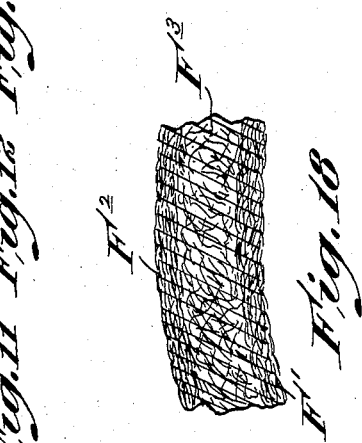
Inventor
Eugene L. Perry
by Roberts Cushman & Woodberry
Att'ys.

Patented Jan. 2, 1945

2,366,212

UNITED STATES PATENT OFFICE 2,366,212

APPARATUS FOR FORMING HOLLOW ARTICLES

Eugene L. Perry, Bloomfield, N. J., assignor to Universal Winding Company, Cranston, R. I., a corporation of Massachusetts Application January 2, 1941, Serial No. 372,716

34 Claims. (Cl. 92—56)

This invention pertains to apparatus for forming articles from material of a fibrous nature. While in its broader aspects the apparatus herein disclosed is of more general utility, it is herein specifically described and illustrated by way of example as designed and arranged for making textile winding cores or cones.

In my copending application for Letters Patent, Serial No. 352,601, filed August 14, 1940, I have disclosed and claimed a novel and highly useful process or method of forming hollow articles, for example textile cones, from fibrous material. A principal object of the present invention is to provide a machine capable of forming hollow fibrous articles substantially in accordance with the process or method disclosed in my aforesaid application.

A further object of the invention is to provide apparatus of automatic or semi-automatic character capable of forming hollow bodies of annular section directly from a fiber-bearing fluid compound. A further object is to provide apparatus useful in the initial forming of textile cores or cones directly from a fiber-bearing fluid compound and which, immediately after forming and while still quite wet, are self-sustaining and capable of being handled without substantial deformation. A further object is to provide apparatus capable of forming hollow annular bodies, which, as initially formed, have inner and outer surfaces which are substantially true surfaces of revolution. A further object is to provide apparatus useful in forming textile cores or cones directly from a fiber-bearing fluid which, after subjection to subsequent operations, acquire such strength as to make them wholly suitable for their intended use. In referring herein to a "fiber-bearing fluid compound" or "fluent, fiber-containing substance," applicant has employed the term "fluid" to designate a freely flowing medium wherein insoluble solid constituents are suspended in a liquid vehicle.

A further object is to provide apparatus operative to form from a fluent, fiber-containing substance a hollow article whose wall comprises concentric integrally joined strata, the outer and inner strata, respectively, being harder and more dense than the intermediate stratum.

A further object is to provide apparatus operative to form a hollow annular article whose wall comprises concentric integrally joined strata wherein the fibers which constitute the inner and outer strata are predominantly disposed to lie in more or less concentric arcs, while the fibers which compose the intermediate stratum are indiscriminately oriented.

A further object is to provide apparatus capable of forming such articles at high speed and of producing a product of uniform character. A further object is to provide apparatus, capable of forming such hollow fibrous articles, which does not necessitate the employment of highly skilled workers in the performance of the process. A further object is to provide apparatus which is of simple and durable construction; which operates substantially continuously; and which does not require excessive power for driving it.

A further object of the invention is to provide apparatus arranged to receive the fibrous material at a feeding station and to deliver the formed articles at a delivery station, all without interruption of the continuous operation of the machine. A further object of the invention is to provide a machine capable of forming several articles at the same time, successive steps in the forming operation, as respects the several articles, being carried out simultaneously.

Other and further objects and advantages of the invention will be pointed out hereinafter in the following more detailed description and by reference to the accompanying drawings, wherein Fig. 1 is a diagrammatic plan view of the apparatus with certain parts broken away;

Fig. 2 is an elevation of the apparatus of Fig. 1 (certain parts being broken away), looking in the direction of the arrow A (Fig. 1);

Fig. 3 is a fragmentary vertical section substantially on the line 3—3 of Fig. 1, showing certain details of the rotating table upon which the forming devices are mounted;

Fig. 4 is a fragmentary elevation looking substantially in the direction of the arrow B (Fig. 1) and showing the forming devices with the upper or inner former in elevated position;

Fig. 5 is a fragmentary diametrical section, to large scale, showing details of the upper or inner former and with certain parts broken away;

Fig. 6 is a diagrammatic plan view of the rotating table, illustrating the valve ports for controlling the air pressure at the formers;

Fig. 7 is a fragmentary diametrical section through the formers, showing the upper or inner former partly entered into the outer former;

Fig. 8 is a diagrammatic development of the cam which controls the upper or inner former;

Fig. 9 is a fragmentary elevation, to large scale, looking substantially in the direction of the arrow C (Fig. 1);

Figs. 10 to 17 inclusive are diagrammatic views indicating the sequence of operations in forming a hollow article by the use of the apparatus of this invention;

Fig. 18 is a fragmentary diagrammatic horizontal section through the wall of a hollow article formed by the present apparatus indicating the structural characteristics of such wall; and Fig. 19 is a diagram indicating the several zones of operation through which the forming devices pass.

As above pointed out, the purpose of the present apparatus is to form hollow articles, for example textile cores or cones, in an embryo but self-sustaining state directly from a fiber-bearing fluid. In order to expedite the several operations which are concerned in the formation of this embryo cone, it is desirable that said operations be carried out in a continuous sequence and without substantial interruption. To this end it is desirable that the several operations be performed at successive zones in an endless path, and with this in view the forming appliances may be mounted upon an endless conveyor and carried bodily through these several zones during the performance of the several operations.

While other types of conveyor may be useful for the purpose, the apparatus herein specifically disclosed by way of example employs a rotating, substantially circular horizontal table T as a support for the forming appliances. Thus, as diagrammatically illustrated in Fig. 19, the table T is arranged to turn in an anti-clockwise direction, and in thus turning carries the forming devices successively through a filling zone, a stratifying zone, a pressing zone, a separating zone, a compacting zone, and an expanding and removing zone.

Before describing the apparatus in detail, it may be helpful to suggest by the use of diagrams the sequence of operations employed in making a hollow article by means of the apparatus herein specifically disclosed. Thus, referring to Figs. 10 to 17, inclusive, the forming means comprises the lower or outer former or matrix 39, which is of foraminous or screen material and which is supported to rotate within a suction chamber 20 defined by the fixed outer casing 19. This outer former or matrix 39 is carried by a vertical shaft 22 and is constantly rotated. Provision is made for establishing a subatmospheric pressure in the chamber 20. The outer former or matrix 39 is provided with an upwardly extending cylindrical portion 47 defining a filling chamber. The upper or inner former 62 is shaped to fit within the outer former or matrix 39 and is also of foraminous material and is hollow, providing the interior chamber 70 within which a subatmospheric pressure may be established when desired.

When the forming means arrives at the filling zone, the inner former 62 has been raised, as shown in Fig. 10, thus leaving the part 47 open at the top for the reception of a charge of fiber-bearing fluid. The outer former or matrix 39 is rotating and continues to rotate throughout the operation. When the charge W of material has been deposited in the outer former 39, the charge soon begins to rotate with the former 39. The inner former 62 is now moved downwardly gradually into the outer former, as shown in Figs. 11 and 12, and by reason of the frictional action of the rotating fluid, quickly begins to rotate with the outer former but with a substantial lag, as compared with the angular velocity of the latter. Subatmospheric pressure is established in the chamber 20 and in the chamber 70, so that the major part of the liquid comprised in the fluid charge W is rapidly sucked away and the fibrous material W' of the charge is deposited in the annular space between the formers (Fig. 13). Due to the lag of the inner former, as compared with the outer former, the fibers composing the charge W tend to dispose themselves in more or less concentric arcs where they contact with the foraminous walls of the inner and outer formers, respectively, thus forming the strata $F^1$ and $F^2$ (Fig. 18) in which these fibers are disposed in more or less concentric arcs, although at the intermediate stratum or layer $F^3$ the fibers are indiscriminately disposed. The inner former descends until it occupies the position shown in Fig. 13, thus mechanically compressing the deposited fibrous material W'. Atmospheric pressure is then admitted to the chamber 20, and the former 62 is elevated—the deposited layer C of fibrous material adhering to the outer surface of the former 62 (Fig. 15). A compressing roller 128 now engages the outer surface of this layer C and compresses said layer while suction is maintained at the interior of the former 62. After a suitable period of compression, atmospheric pressure is admitted to the interior of the former 62 and the roller 128 further compresses the layer C, with the result that the layer is diametrically expanded and loosened on the former 62 and may readily be removed, as shown in Fig. 17, as a coherent, self-sustaining, hollow, seamless, fibrous mass C' more or less resembling the desired finished cone in its shape but being somewhat larger and having walls which are substantially thicker than those of the desired completed cone.

The above sequence of operations is repeated at each revolution of the table T, each pair of formers 39 and 62 which may be carried by the table producing one of the embryo cones C' at each such revolution, such embryo cones being subjected to further operations by mechanism not forming a part of the present invention, the result being to produce a cone which is strong, durable and capable of withstanding the stresses and shocks to which a textile cone is subjected during use.

Having thus described the general mode of operation of the apparatus, the apparatus will now be described in detail.

Referring to Figs. 1 and 2, the apparatus as a whole is shown as comprising the horizontal rotating table T upon which the forming devices are mounted; the fluid supply tank or reservoir S in which is maintained a supply of the fiber-bearing fluid; a receptacle R designed to receive the liquid which is removed from the charge of fiber-bearing fluid during the formation of each hollow article; and an air pump P designed, at times, to establish subatmospheric pressure at the formers.

Referring to Fig. 3, the table T is shown as carried by a base 1, which may be a casting, if desired, and which preferably has spaced legs 2. This casting is preferably circular in plan and is provided at spaced points about its circumference with brackets 3 upon which are mounted rollers 4 on which the table T rests. The base 1 is provided with a central annular hub 5 which receives a vertical sleeve 6 which may be of bronze or other bearing metal if desired and which is fixed within the hub and which extends up through an opening in a boss 7 at the center of the table T. The table turns with a free rotating fit upon the sleeve 6, the latter retaining the table in concentric relation with the base 1.

The table is preferably furnished with a downwardly directed flange at its rim, such flange being provided with one or more V-grooves 8 (Fig. 4) which receive an endless belt or belts 9. This belt passes around idler pulleys 10 (Fig. 1) mounted upon a fixed elevated support 11 and also passes about a drive pulley 12 secured to a vertical drive shaft journaled in the support 11, said shaft being furnished with a worm wheel which meshes with a worm 13 carried by a shaft 14, also journaled in the support 11. This shaft carries a drive pulley which is engaged by a belt 15 passing around a pulley on the shaft of a motor 16. When the motor 16 is in operation, the table T is slowly rotated.

In the present drawings a single pair of formers 39 and 62 is illustrated, but it is to be understood that a plurality of such pairs of formers may be mounted upon the table at spaced points, and that each pair of formers will be like that here illustrated, and will be actuated in the same way. The lower or outer former or matrix of each pair is arranged to rotate within a suction chamber 20 as above described. As shown in Fig. 7, each such suction chamber comprises an annular base or support, for example a casting, having a flange 17 by means of which it is bolted to the table near the periphery of the latter. This base or support comprises a circular portion 18 which fits snugly and leak-tight within the lower end of a cylindrical housing 19 which defines the side walls of the suction chamber 20. The base or support also comprises the central upstanding circular boss 21. A vertical journal opening extends down through the entire thickness of this base or support, said journal opening being coaxial with an opening 23 in the table, and in this journal opening turns the vertical shaft 22 which projects down through the table and which is furnished at its lower end with a drive pulley 24 (Fig. 4). To support this shaft below the table a bracket 22ª is secured to the under side of the table and is provided with a bearing 22ᵇ for the shaft 22 at a point just above the pulley 24.

An endless belt 25 (Fig. 1) passes around the pulley 24 and also about idler pulleys 26 arranged at spaced points about the periphery of the table T, such pulleys 26 being mounted upon vertical shafts 27 (Fig. 3) journaled in brackets 28 secured to the under side of the table. The belt 25 also passes about an idler pulley 25ª (Fig. 1) carried by a bracket 25ᵇ projecting from the base 1, and also passes around a drive pulley 29 secured to a vertical shaft which carries a second pulley 30. The belt 25 also passes around a tensioning pulley 31 carried by a lever 32 pivoted at 33 to the base 1 and which is urged in a clockwise direction as viewed in Fig. 1 by a spring 34. The pulley 31 thus constantly presses against the belt 25 and tends to keep the latter tightly engaged with the driving pulley 29. An endless belt 35 passes around the pulley 30 and around a pulley on the shaft of a motor 36. The motor 36 is constantly driven during the operation of the machine and thus constantly rotates the shaft 22 regardless of the position of the table T.

The upper end of the shaft 22 (Fig. 7) is furnished with a head 37 which rests upon an annular packing 38 disposed in an annular groove in the upper surface of the boss 21. This head 37 is preferably provided with a central circular recess or depression and constitutes a support for the lower or outer former or matrix 39. This outer former, as here illustrated, comprises an outer rigid frusto-conical shell 40 which may be of cast metal, for instance, bronze or the like, and whose lower end fits within the central recess in the head 37.

The shell 40 is provided with a multitude of apertures 41 leading from its interior to its exterior and constitutes a support for a foraminous lining wall 42. Preferably the apertures 41 are of graduated diameter, being smaller at the lower portion of the shell 40 than at its upper part. As here illustrated this lining wall comprises several layers of foraminous material, for example, finely woven wire mesh fabric, although possibly for some purposes other materials such as textile fabric, felt or very finely perforated sheet material may be substituted. The inner layer of this foraminous side wall joins with a bottom wall 43 to form a smooth uninterrupted lining for the chamber within the outer former, while the outer layer or layers extend downwardly to the part 37 and are clamped between the lower portion of the shell 40 and an interior plug 44 of rigid material upon which rests the bottom wall 43 of the inner ply. The margin of the bottom wall 43 is united to the side wall 42 by pressure or otherwise, or it may be made integral with the inner ply of the side wall. The upper margins of the layers forming this foraminous side wall are clamped between the upper part of the shell 40 and a clamping ring 45 which sets down into a recess in an outwardly directed flange portion 46 forming the top of the shell 40.

This flange portion 46 is furnished with an upstanding margin which receives the lower end of the substantially cylindrical shell 47 which is fixedly secured to the flange 46 and whose interior 48 constitutes a filling chamber which is in fact an upward extension of the chamber 49 defined by the foraminous walls 42 and 43. The height of the cylindrical extension 47 is such that the filling chamber 48, combined with the space 49, provides sufficient cubic capacity for the reception of a charge of fiber-bearing fluid sufficient in quantity to furnish the requisite amount of fiber to form the desired article after the major part of the liquid has been removed from such fluid charge.

The upper end of the housing 19 is defined by a flange 50 which is shaped to provide an annular groove for the reception of packing 51 which is compressed by means of a suitable clamping ring 52. The packing at 38 and the packing at 51 prevent leakage of fluid into the chamber 20, although allowing rotation of the outer former 39 together with its extension 47.

Closely adjacent to the housing 19 (Fig. 4) but disposed radially inward with reference to the housing 19 is a base 53 secured, for example by bolts, to the upper surface of the table. From this base rise parallel rigid guide members 54 and 55 which provide between them a vertical guideway for a vertically movable carriage 56 (Fig. 4). This carriage has a pair of vertically spaced, outwardly directed brackets 57 and 58 (Figs. 2 and 4). The brackets 57 and 58 are provided with aligned openings which are in axial alignment with the outer former 39 and its supporting shaft 22. In the opening in the bracket 58 there is mounted a swivel support 59 (Fig. 4) for the upper end of a tubular member 60 constituting a portion of the inner former. Preferably this swivel support 59 comprises anti-friction bearings at 59ª which carry the weight of the inner former and its associated parts and which permit the inner former to rotate very freely. A fixed conduit member 57ª extends down through the bearing 57 and into the swivel support 59, there being suitable packing (not shown) between the parts 57ª and the part 60 so as to prevent leakage of fluid at the region of the swivel support.

The upper or inner former 62 (Fig. 5) comprises the rigid shell 63 which may be of cast metal, for instance bronze, and whose upper end is fixed to the lower end of the rotatable tubular member 60. This shell is here shown as of truncated frusto-conical shape and has a multitude of perforations 64 extending from its exterior to its interior. This shell constitutes a support for a foraminous outer side wall 65 which may, like the wall of the outer former or matrix, consist of one or more plies of fine wire mesh fabric or the like. The sides of this foraminous wall preferably merge smoothly and integrally with a bottom wall 66. The plies of material forming this foraminous wall are clamped at their upper edges between the shell 63 and the inner, upwardly flaring edge of a radial flange member 67, the latter being secured to the shell 63 by means of a flanged sleeve 68. The bore 69 in the tubular member 60 communicates at its lower end with the space 70 (Fig. 7) inside of the inner former 62, while the upper end of the conduit 57ª has connected to it a flexible pipe or conductor 71 which leads to a valve housing 73 (Fig. 3) arranged at the center of the table T.

This valve housing 73 (Fig. 3) is provided with a central hub which fits over and is fixedly secured to the upper end of the stationary sleeve 6. This valve housing 73 is furnished with a central chamber 74 (Figs. 3 and 6) which communicates, by means of radial passages 75, 76 and 76ª, with arcuate recesses 77, 78 and 78ª, respectively, in the upper surface of the stationary portion of the valve housing. The valve housing is also furnished with an air inlet port 79 (Fig. 3) which communicates with an arcuate recess 77ª in the upper surface of the stationary part of the valve housing. The recesses 77 and 78ª are of short angular extent while the recess 78 is substantially longer, the recesses 77, 77ª, 78 and 78ª being concentric. The recess 77 is of the same radius as the recess 77ª, while the recess 78 is of greater radius. The recess 78ª is of the same radius as the recess 78 but is of substantially shorter angular extent.

Resting upon the top of the valve housing 73 and held in properly concentric relation to the latter by means of an upstanding peripheral flange carried by the valve housing is a rotatable valve plate 80. This valve plate is connected to the vertical post 54 (Fig. 3) by means of a rigid bracket 81 so that as the table rotates, and with it the post 54, the valve plate 80 is compelled to rotate at the same speed.

The flexible conduit 71 which leads to the interior of the inner former is connected to a nipple 72 projecting up from the valve plate 80, said nipple being fixed within an opening in the valve plate which registers at times with the recess 77 and at other times with the recess 77ª. A second nipple 82 projects up from the valve plate 80, said nipple being aligned with an opening which registers at times with the recess 78 and at other times with the recess 78ª. A flexible conduit 83 extends from the nipple 82 to a nipple 84 (Fig. 7) fixed in the wall of the housing 19, such conduit thus connecting the suction chamber 20 at all times with the nipple 82.

Secured to the fixed sleeve 6 (Fig. 3) at a point just above the surface of the table T is a cam cylinder comprising the central hub 84 which is pinned to the sleeve 6, the horizontal web 84ª, and the peripheral upstanding wall 85, the latter being substantially concentric with the table but spaced inwardly from the margin of the table. The upstanding, substantially cylindrical wall 85 of this stationary cam cylinder is provided with a contoured upper edge constituting a cam for controlling the vertical position of the inner former. Thus, as illustrated in Fig. 8, which is a development of this cam, the edge of the cam comprises a substantially horizontal portion 85ª, which is in advance of the filling position indicated substantially at I (Fig. 8). From this point the cam edge inclines steeply downward at 85ᵇ to the point II and thence inclines downwardly but at a lesser slope at 85ᶜ to the point III. From this point the cam edge is substantially horizontal at 85ᵈ until the point IV is reached and thereafter the cam edge rises on a slope at 85ᵉ to the point V. From this point the cam edge again rises slightly and for a short distance at 85ᶠ is at a maximum elevation, this elevation terminating at the point VI where the edge drops quickly to the horizontal level 85ª again.

The carriage 56 which supports the inner former is provided with a roll 86 (Fig. 3) which rests upon the cam edge, just above described, so that as the table revolves, this roll, by following the cam edge, raises and lowers the carriage 56 and thus moves the upper or inner former 62 up and down relative to the outer former or matrix 39, although at all times the upper or inner former is axially aligned with the lower or outer former.

Merely as an example of charge delivering means which may be employed, but without intent thereby to limit the invention to such illustrative embodiment, there is here shown a fixed column or post 87 (Figs. 1 and 2), disposed radially out from the edge of table T adjacent to the location of the filling station, said post being provided at its upper end with a rotatable support 88. This support carries a downwardly inclined trough 89 whose lower end is furnished with a delivery opening 90 (Fig. 1) which may at times be disposed above the upper end of the cylindrical extension 47 of the lower former so as to deliver a charge of fiber-bearing fluid into the chamber 48.

A measuring receptacle 91 is arranged within the trough 89, preferably being mounted upon trunnions 92 and having a handle 93 by means of which it may be dumped into the trough. This receptacle 91 is of such capacity that, when filled, it holds a charge of fiber-bearing fluid just sufficient to provide the fiber necessary to form one of the desired articles. While as here illustrated, the delivery of the charge into the chamber 48 is a manual operation, it is contemplated that the delivery of the charge may be automatic and timed and controlled by a cam or the equivalent carried by the table T.

The supply tank S is furnished with an outlet or delivery pipe 95 (Fig. 1) which communicates with the intake of a pump 96 driven by a motor 97. The delivery pipe 98 from this pump 96 extends to a fitting 99 suitably supported in an elevated position and directly above a portion of the path of the measuring receptacle 91 as the latter is swung horizontally with the support 88. This fitting 99 carries a valve 100 (Fig. 2) having a delivery nozzle 101 through which the fluid material may be delivered into the measuring receptacle 91. From the fitting 99 extends a return pipe 102 leading into the upper part of the supply tank S. With this arrangement the pump 96 may be operated continuously, thereby to circulate the fluid through pipe 95, 98 and 102. This is desirable in order to prevent any settling and separation of the component elements of the fluid charge on the way from the supply tank to the measuring receptacle 91. The supply tank is also preferably furnished with a stirring device 103 driven by a motor 104 so as to keep the contents of the tank thoroughly mixed at all times.

At a location in advance of the filling station there is arranged a carriage 105 (Figs. 1 and 9) disposed outwardly beyond the edge of the table T and which is supported by rolls 106 (Fig. 9) resting upon a suitable horizontal support 107. Beneath the carriage 105 is arranged a fixed guide member comprising spaced portions 108 defining between them an arcuate slot 109. This slot is not exactly concentric with the table, its lower end (as viewed in Fig. 1) being nearer to the edge of the table than its upper end. In this slot is arranged a guide roll 110 carried by a rigid bracket 111 fixed to the carriage 105. The carriage 105 is also provided with a rigid bracket 112 (Figs. 1 and 9) which carries a second guide roll 113 which engages a fixed vertical surface 114 which is concentric with the slot 109 and which forms part of a flange extending from the support 107. The guide rolls 110 and 113, by engagement with the walls of the slot 109 and with the curved surface 114, respectively, constrain the carriage 105 to travel in a path which gradually approaches the edge of the table.

At a point closely adjacent to the location of the housing 19 the table is provided with a projecting detent member 115 (Figs. 1 and 9) and the carriage 105 is provided with a pivoted latch lever 116 whose free end is urged outwardly toward the edge of the table T by means of a suitable spring. The latch lever 116 is also furnished with an arm carrying a roll 117 which is so arranged, that, at a predetermined point in the travel of the carriage 105, it engages a cam surface 118 carried by a fixed member 119 upstanding from the support 107. A spring 120 connected to the carriage 105 tends to move the carriage in a clockwise direction as viewed in Fig. 1, but when the detent 115 engages the latch 116, the carriage is thereby forced to revolve with the table until the roll 117 engages the cam 118 and thereby retracts the latch 116 from the detent 115, whereupon the spring 120 quickly restores the carriage 105 to its normal position with the roll 110 in the right-hand end of the slot 109 as viewed in Fig. 1.

The carriage 105 supports a vertical post P (Fig. 9) having a bracket 121 secured to its upper part. This bracket provides journals for an inclined shaft 122 having a worm wheel 123 secured to its upper end. This worm wheel meshes with a worm 124 (Fig. 1) on a shaft 125 carrying a pulley 126 which receives a drive belt 127 passing about a pulley on the shaft of a motor 128 mounted on the carriage 105. The shaft 122 carries a pressure-applying roll 129. This roll is of frusto-conical shape and preferably has a surface which is to some extent resiliently yielding and which is preferably rough so as to prevent slippage. Conveniently the surface of this roll may be of woven wire mesh or the like. The shaft 122 is inclined to the vertical to such a degree that when the roll 129 engages the layer C of fibrous material adhering to the inner former 62, the periphery of the roll 129, at its point of contact with the layer of material, has substantially the same slope as the wall of the inner former. By reason of the non-concentric relation of the guides 109 and 114 with respect to the table T, the carriage 105 gradually approaches the edge of the table as the carriage moves with the table, and thus the roll 129 applies a progressively increasing pressure to the fibrous mass C. While the reciprocating carriage with its single pressure-applying roll constitutes one means for obtaining the desired result, it is contemplated that equivalent means may be substituted, for instance, a series of rolls mounted upon pivoted supports and urged by springs or the like into operative contact with the fibrous layer C on the former 62.

Referring to Figs. 1 and 3, a pipe 74$^a$ extends up through the sleeve 6 and communicates with the chamber 74 within the valve housing 73. This pipe leads to the air-exhaust pump P which is driven by a belt 74$^b$ by means of a motor (not shown). From the pump P extends a delivery pipe 74$^c$ which leads to the receptacle R.

In the operation of the device above described, it will be assumed that the table T is slowly rotating, that the motor 36 is constantly rotating the shaft 22 and thus turning the outer former 39 with its upward extension 47; that the supply tank S has been furnished with a supply of fiber-bearing fluid; and that the pump P is in operation. It is further assumed that the table has turned until the forming devices have reached the filling station and that a measured supply of the fiber-bearing fluid has been admitted to the receptacle 91 by the manipulation of the valve 100, and that the operator has swung the trough 89 so that its delivery opening 90 is directly above the open upper end of the cylinder 47 as the latter reaches the filling station, it being noted that at this point the roll 86 is resting upon the horizontal portion 85$^a$ of the cam track and that the inner former is thus raised completely out of the cylinder 47. The operator thereupon dumps the receptacle 91 into the trough 89 and moves the latter in time with the table so as to allow the fluid to flow into the cylinder 47 as the latter continues to revolve with the table. The measured charge of material then flows into the cylinder 47 and down into the chamber 49 of the rotating outer former. The fluid charge W immediately begins to rotate and the roll 86 immediately starts down the cam track 85$^b$. The inner former 62 thus rapidly descends into the cylinder 47 and begins to rotate by reason of the frictional drag of the fluid charge, and at substantially the same time the nipples 72 and 82 on valve plate 80 are brought into registry with the recesses 77 and 78, respectively, thus establishing subatmospheric pressure within the chambers 70 and 20.

As the inner former descends, the flange member 67 enters the cylinder 47, in which it fits with a snug sliding fit, thus adding mechanical pressure to the fluid charge and increasing the speed of ejection of the liquid from the charge W now confined between the inner and outer formers, the fibrous material being deposited in the annular space between the formers in concentric integrally merged layers or strata as above described. The inner former now continues to descend, but more slowly, as cam roll 86 moves along the part 85$^c$ of the cam track, thus compressing the fibrous material. At the station III the inner former has reached its lowermost position with the fibrous material W' freed of the greater part of the liquid.

At about this point the nipple 82 moves out of registry with the recess 77 but almost immediately thereafter moves into registry with the recess 77ª. The latter recess is in communication with the atmosphere so that almost at once atmospheric pressure is established in the chamber 20. However, the nipple 72 continues to register with the recess 78 while the cam roll traverses the path 85ᵈ, thus maintaining suction within the chamber 70 in the inner former while continuing to apply mechanical pressure to the fibrous material. When the cam roll reaches the station IV, it begins to ride up the inclined cam face 85ᵉ and thus begins to lift the inner former from the outer former with the layer C of fibrous material adhering to the inner former. When the nipple 72 reaches the end of the recess 78, suction is cut off from the chamber 70.

When the cam roll reaches the station V, it rises onto the short elevation 85ᶠ, this elevation being just sufficient to lift the flange 67 of the inner former up onto the upper surface of the roll 129. As the flange 67 comes radially opposite the roll 129 the detent 115 engages the latch lever 116 and the carriage 105 together with the roll 129 begins to move with the table T, thus keeping the roll 129 in contact with the fibrous layer C on the inner former 62. The roll 86 immediately rides down from the elevation 85ᵇ onto the horizontal surface 85ª, thus allowing the flange 67 to rest on the upper surface of the roll 129. The inner former 62 is thus caused to rotate by the engagement of the flange 67 with the rotating roll 129. The rotating roll 129 thus exerts substantial radial pressure against the material C, tending to compact the latter. During this time the nipple 72 has registered with the recess 78ª, thus again providing full suction in the chamber 70. The external pressure together with the internal suction firmly compacts the material C, at the same time smoothing out any irregularities incident to the lifting of the fibrous mass from the outer former.

When the nipple 72 reaches the end of the recess 78ª, suction is cut off from the interior of the former 62 but the rotating roll 129 continues to press against the mass C. In thus pressing against this mass, in the absence of internal suction, the fibrous mass tends to expand circumferentially due to the rolling action of the roller 129 and thus becomes loose on the former 62. Just before the formers reach the filling station, the detent 115 is disengaged from the latch 116 and the carriage 105 suddenly returns to its initial position, thus leaving the loosened mass of material C on the inner former 62 free to be removed from the former. Under most conditions it will drop freely from the former and may be received by any suitable type of conveyor or other device (not shown) for carrying it to the next stage of operation. However, it may be removed by hand and placed upon a suitable conveyor or other receptacle. The embryo article thus delivered from the inner former is self-sustaining and capable of being lifted and handled without crumbling or substantial deformation. The machine parts are now in position for a repetition of the cycle of operations above outlined.

While the conveyor (table T) as here disclosed carries but one pair of formers, it is obvious, as above suggested, that the conveyor may be provided with a plurality of pairs of forming devices, each pair operating like the pair above described, but being filled successively and concomitantly performing different steps in the operation. Such an arrangement is regarded as within the scope of the invention.

Moreover, it is to be understood that the invention is not necessarily confined to this particular arrangement of parts but is capable of embodiment in any and all other specific arrangements such as fall within the terms of the appended claims.

I claim:

1. Apparatus for use in making hollow articles of annular section, said apparatus comprising concentric relatively rotatable foraminous walled receptacles defining between them an annular space for a body of fluid comprising liquid and fibrous material, suction means for withdrawing a major part of the liquid from said body, and means, including devices for turning one only of said receptacles, operative concomitantly with the action of said suction means to cause the fibrous material to deposit within said annular space in the form of three concentric integrally joined strata.

2. Apparatus for making hollow annular articles of fibrous material, said apparatus comprising inner and outer coaxial foraminous-walled rotatable formers, means operative to direct a charge of fluid comprising liquid and fibers suspended therein into the outer former, suction means for removing liquid from the body of fluid in the former, and means operative so to positively rotate at least one of the formers and to actuate the suction means as to remove the major part of the liquid from said fluid charge while concomitantly depositing the fibrous material as a coherent stratified mass in the space between the formers.

3. Apparatus for use in making hollow articles of annular section, said apparatus comprising inner and outer coaxial, hollow, rotary formers, means for directing a body of fluid comprising liquid and fibrous material into the space intervening between said formers, suction means associated with each former, means operative to rotate at least one of said formers, and means operative to initiate and to terminate the action of the respective suction means, the parts being so constructed and arranged as to cause the fibrous material to deposit within the space between the formers in three integrally joined strata having the fibers which constitute the inner and outer strata predominantly disposed in concentric arcs.

4. Apparatus for making hollow annular articles of fibrous material, said apparatus comprising inner and outer coaxial, rotatable, foraminous-walled formers, means operative to direct a charge of fluid comprising liquid and fibrous material into the outer former, suction means operative to withdraw liquid from the body of fluid in the former, means operative positively to rotate the outer former, the inner former being movable into and out of the outer former, and control means operative to determine the times of action of the suction means and the position of the inner former.

5. Apparatus for use in making hollow articles of annular transverse section, each such article comprising three concentric integrated strata wherein the individual fibers constituting the inner and outer strata are disposed predominantly to form arcs of concentric circles while the fibers constituting the intermediate stratum are indiscriminately oriented, said apparatus comprising rotary coaxial formers, each having a foraminous peripheral wall, defining an annular space bounded by concentric screen walls, means for directing a body of fluid comprising liquid and fibrous material into the space defined by the outer screen wall, means for positively rotating but one of said screen walls whereby the second screen wall is caused by the friction of the fluid body to rotate in the same direction but at a different speed thereby to cause individual fibers adjacent to said walls to extend circumferentially of said walls, and suction means for withdrawing liquid from said body concomitantly through both screen walls.

6. Apparatus for use in making hollow articles of annular section, said apparatus comprising a pair of coaxial, hollow, rotatable formers having foraminous walls, said formers being of such respective dimensions that, when one is inserted within the other, the annular space intervening between said walls is of a radial thickness at least as great as the desired radial thickness of the wall of the article to be formed, means operative positively to rotate the outer former, means operative to move the inner former into and out of the outer former, means operative to direct fluid comprising liquid and fibrous material into the outer former, and means operative to withdraw liquid through both foraminous walls simultaneously.

7. Apparatus for use in making hollow articles of annular section, said apparatus comprising a pair of coaxial, hollow, rotatable formers having foraminous walls, said formers being of such respective dimensions that, when one is inserted within the other, the annular space intervening between said walls is of a radial thickness at least as great as the desired radial thickness of the wall of the article to be formed, means operative to direct fluid comprising a liquid and fibrous material into the outer former, means operative to move the inner former axially into and out of the outer former, means operative positively to rotate one of said formers, the other former being free to rotate in response to the frictional drag of said fluid, and means operative to withdraw liquid through both of said walls simultaneously.

8. Apparatus for use in making hollow annular articles from fluid comprising liquid and fibers suspended therein, said apparatus comprising inner and outer coaxial rotary formers having foraminous walls, the outer former being open at its top, means providing a suction chamber exterior to the wall of the outer former in which subatmospheric pressure is at times maintained, means operative to move the inner former axially down from a point above the open top of the outer former into the latter, means for guiding the inner former in its movement, and means for rotating the outer former.

9. Apparatus for use in making hollow annular articles from fluid comprising liquid and fibers suspended therein, said apparatus comprising inner and outer coaxial rotary formers having foraminous walls, the outer former being open at its top, means providing a cylindrical filling chamber coaxial with and extending above the open top of the outer former, a stationary housing for the outer former providing a suction chamber exterior to the wall of said former, means for establishing a subatmospheric pressure in said chamber, means operative to move the inner former down into the outer former, and means for rotating the outer former.

10. Apparatus for use in making hollow annular articles from a fiber-bearing liquid, said apparatus comprising inner and outer coaxial rotary formers having foraminous walls, the outer former being open at its top, means providing a cylindrical filling chamber coaxial with and extending above the open top of the outer former, a housing for the outer former providing a suction chamber exterior to the wall of said former, means for establishing subatmospheric pressure in said suction chamber, means operative to move the inner former from a position above said filling chamber downwardly through the latter and into the outer former, and means for rotating one, at least, of said formers.

11. In apparatus of the class described, in combination, a pair of coaxial foraminous-walled formers, each of inverted substantially frusto-conical shape, means supporting each former for rotation, means operative positively to rotate one of said formers, the supporting means for the inner former being so designed and arranged that the inner former may be moved axially into and out of the outer former, a fixed housing providing a suction chamber within which the outer former is arranged, means for establishing subatmospheric pressure within said housing, and means operative to establish subatmospheric pressure within the inner former.

12. In apparatus of the class described, in combination, inner and outer coaxial formers, each of inverted substantially frusto-conical shape, the outer former comprising a rigid perforate shell supporting a foraminous inner wall, the inner former comprising a rigid perforate shell supporting an outer foraminous wall, means for creating suction at the inside of the inner former a rotatable support to which the small end of the shell of the outer former is secured, means for positively rotating said support, and supporting means for the rigid shell of the inner former so constructed and arranged that said shell may rotate freely.

13. In apparatus of the class described, in combination, inner and outer coaxial rotatable formers each having a foraminous wall, the outer former being of inverted substantially frusto-conical shape having an open top, means operative positively to rotate the outer former rigid perforate means supporting the wall of the outer former at the outside of the latter, rigid perforate means supporting the wall of the inner former at the inside of the latter, and means operative to establish subatmospheric pressure at the outside of the outer former and at the inside of the inner former.

14. In apparatus of the class described, in combination, outer and inner foraminous-walled rotatable formers, suction means operative to establish subatmospheric pressure at the outside of the outer former and at the inside of the inner former, means operative positively to rotate one only of the formers, means to move the inner former axially into and out of the outer former, and means operative automatically to initiate and terminate the operation of the suction means and to determine the in-and-out movement of the inner former all in predetermined timed relation.

15. Apparatus for use in making hollow articles from a fiber-bearing liquid, said apparatus comprising inner and outer frusto-conical, coaxial, foraminous-walled rotatable formers, means operative positively to turn one of said formers about its own axis, means for bodily moving both formers as a unit in a predetermined path, means operative at one point in said path to direct a charge of fluid comprising liquid and fibrous material into the outer former, suction creating means operative, as the formers move along said path, to withdraw a major part of the liquid from the charge while causing the fibrous material to deposit as a coherent annular mass in the space between the formers, a cam operative at another point in said path to cause the inner former to separate from the outer former with said fibrous mass adhering to it, and means operative at another point in said path to subject said fibrous mass upon the inner former to progressively increasing mechanical pressure.

16. In apparatus of the class described, in combination, outer and inner foraminous-walled frusto-conical, coaxial, rotatable formers, suction means operative to establish subatmospheric pressure at the outside of the outer former and at the inside of the inner former, means operative to direct a charge of fluid comprising liquid and fibrous material into the outer former, means operative positively to rotate one of said formers about its own axis, means operative to move the inner former down into the charge of fluid while removing the major part of the fluid and causing the fibrous material to deposit as a coherent mass within the space between the formers, mechanical means operative to raise the inner former with the mass of fibrous material adhering thereto, and means operative to free the adhering fibrous mass from the inner former, said latter means including a mechanical drive for rotating the inner former, and means for applying radial pressure to the fibrous mass adhering to the inner former.

17. In apparatus of the class described, in combination, outer and inner rotatable foraminous-walled formers, the inner former being movable axially relative to the outer former into and out of the latter, means operative to rotate one at least of said formers, means operative to direct a charge of fluid comprising liquid and fibrous material into the outer former, suction means operative to establish subatmospheric pressure at the outside of the outer former and at the inside of the inner former, and cam actuated means, operative to move the inner former downwardly into a charge of fiber-bearing fluid contained in the rotating outer former, valve means operative to establish suction at the outside and inside of the outer and inner formers, respectively, valve means operative to break the suction at the outside of the outer former, to elevate the inner former, and valve means operative thereafter to break the suction at the inside of the inner former.

18. In apparatus of the class described, in combination, outer and inner foraminous-walled rotatable formers, suction means operative to establish subatmospheric pressure at the outside of the outer former and at the inside of the inner former, means operative to rotate the outer former, means operative to direct a charge of fluid comprising liquid and fibrous material into the outer former while the latter is rotating, cam actuated means operative to move the inner former down into the body of fluid in the outer former, the inner former being thereby set into rotation by the frictional drag of the fluid, valve means operative, when the inner former is rotating, to connect the outside of the outer former and the inside of the inner former to the suction means thereby to withdraw the major portion of the liquid and to deposit the fibrous material as a coherent mass within the space between the formers, valve means operative to admit atmospheric pressure to the outside of the outer former, cam means operative to raise the inner former from the outer former, and valve means operative to cut off communication between the interior of the inner former and the suction means.

19. In apparatus of the class described, in combination, outer and inner rotatable foraminous-walled formers, the inner former being movable axially into and out of the outer former, means operative constantly to rotate the outer former, suction means operative to establish subatmospheric pressure at the outside of the outer former and at the inside of the inner former, means operative to direct a charge of fluid comprising liquid and fibrous material into the rotating outer former, cam means operative to move the inner former into the charge of fluid in the outer former, valve means operative to cause the suction means to act after the charge of fluid and the inner former have begun to rotate with the outer former, thereby to remove the major part of the liquid from the charge and to cause the fiber to deposit in the space between the formers, valve means operative to admit atmospheric pressure to the outside of the outer former, cam means operative to elevate the inner former from the outer former, mechanical means operative to rotate the inner former after it has been elevated, and means operative to apply mechanical pressure to the periphery of the mass of fiber adherent to the elevated inner former while the latter is being rotated.

20. In combination, in apparatus of the class described, a rotary horizontal table, a cylindrical housing fixed to the top of the table adjacent to its periphery, a vertical shaft coaxial with said housing, said shaft extending downwardly through the table and being journaled to turn in the table, a drive element fixed to the shaft below the table, a hollow foraminous-walled outer former within the housing and fixed to the upper end of said shaft, means fixed to the table adjacent to said housing and providing a vertical guideway, a carriage movable along said guideway, an inner former rotatably supported by said carriage in axial alignment with the outer former, a fixed cam concentric with the table and with which the cam follower engages thereby to determine the vertical position of the inner former, means for turning the table and concomitantly rotating the outer former, means adjacent to the table for directing a charge of fluid comprising liquid and fibrous material into the outer former, said charge-supporting means being located at a point at which the inner former is raised from the outer former, and pressure means also adjacent to the table, said pressure means being located at a portion of the table at which the inner former is elevated by the action of said cam, the pressure means being operative to apply pressure to fibrous material adherent to the elevated inner former.

21. In combination, in apparatus of the class described, a rotary horizontal table and means for turning it, inner and outer foraminous-walled formers carried by the table, the inner former being axially movable into and out of the outer former, means operative continuously to rotate the outer former as the table revolves, a vertically movable carriage for the inner former, a cam follower on the carriage, and a fixed cam track with which said cam follower engages.

22. In combination, in apparatus of the class described, a rotary horizontal table and means for turning it, inner and outer foraminous-walled formers carried by the table, the inner former being axially movable into and out of the outer former, means operative continuously to rotate the outer former as the table revolves, a stationary cam concentric with the table, a cam follower engaging said cam and actuable thereby to determine the position of the inner former relative to the outer former, a stationary valve housing at the center of the table, means for establishing subatmospheric pressure within said valve housing, suction conduits leading from the valve housing to the interior of the inner former and to the exterior of the outer former, and valve means rotating with the table operative to determine the opening and closing of ports between said valve housing and the respective conduits.

23. In combination, in apparatus of the class described, a rotary horizontal table and means for turning it, inner and outer foraminous-walled formers carried by the table, the inner former being axially movable into and out of the outer former, means operative continuously to rotate the outer former as the table revolves, means for raising and lowering the inner former as the table revolves, a stationary support arranged adjacent to the periphery of the table at a point in the revolution of the latter at which the inner former is elevated, means carried by said support for directing a charge of fiber-bearing fluid into the outer former, a valve housing at the center of the table, and a valve in said housing, said valve being rotatable with the table, said valve being operative to determine the establishment of subatmospheric or atmospheric pressure respectively at the outside of the outer former and at the inside of the inner former at successive predetermined points in the revolution of the table.

24. In combination, in apparatus of the class described, a rotary horizontal table, a cylindrical housing fixed to the top of the table adjacent to its periphery, a vertical shaft coaxial with said housing, said shaft extending downwardly through the table and being journaled to turn in the table, a drive element fixed to the shaft below the table, a hollow foraminous-walled outer former within the housing and fixed to the upper end of said shaft, an inner rotatable former coaxial with the outer former, means supporting the inner former for axial movement, a valve casing, a conduit which extends from the valve casing to the interior of said inner former regardless of the position of the latter, means for establishing a subatmospheric pressure in the valve casing, valve means operative to control a port providing communication between the valve casing and said conduit, and means operative to actuate the valve and to turn the shaft which carries the outer former.

25. In apparatus of the class described, in combination, forming means including an outer former of inverted substantially frusto-conical shape, having an open upper end and foraminous side walls and bottom, an open-topped imperforate cylinder fixed to the upper end of the former and providing a filling chamber opening into the interior of the former, an inner, foraminous walled, freely rotatable former coaxial with the outer former, means operative to move the inner former downwardly through the filling chamber into the outer former, a part carried by the inner former which fits with a sliding fit within said cylinder, said formers being rotatable, and means operative positively to rotate the outer former.

26. In apparatus of the class described, in combination, forming means comprising outer and inner coaxial, rotary foraminous-walled formers, means operative to move the inner former into and out of the outer former, means operative to rotate the outer former, means defining a filling chamber above and opening into the top of the outer former and cooperating with said former to hold a charge of fluid comprising liquid and fibrous material, and a plunger carried by the inner former and fitting within said filling chamber as the inner former descends.

27. In apparatus of the class described, comprising a rotatable foraminous-walled inner former, means for depositing upon said former an adherent coating of fibrous material, the former being of inverted substantially frusto-conical shape, suction means operative to establish subatmospheric pressure within the former, a pressure roll of inverted substantially frusto-conical shape, a radial flange at the larger end of the former which rests upon the larger end of the roll thereby to support the former, means operative to press the roll into contact with the fibrous coating upon the former, and means for rotating the roll.

28. Apparatus for use in making hollow annular articles from fibrous material, said apparatus comprising a conveyor, forming means mounted upon the conveyor, means operative at one point in the path of the forming means to direct a charge of fluid comprising liquid and suspended fibrous material thereinto, means operative, as the forming means moves with the conveyor, to remove the major part of the liquid from the charge while causing the fibrous material to deposit within the forming means as a coherent hollow mass, means operative, during the travel of the forming means with the conveyor, to expose the outer surface of said fibrous mass, and pressure-applying means operative, as the forming means continues to travel, to apply mechanical pressure to the exposed surface of said mass.

29. In combination, in a machine of the class described, a rotary former, means supporting it for bodily movement in a predetermined path, means operative to deposit upon the exterior of said former an adherent coating of fibrous material, a carriage movable in a path adjacent to that of the former supporting means, presser means mounted on the carriage, means operative to move the presser means into engagement with the fibrous coating on the former as the former-supporting means moves along said path, means operative to cause the carriage to move at substantially the same linear speed as the former support, thereby to hold the presser means operatively engaged with the fibrous coating, and means operative, when the carriage reaches a predetermined point in said path, to retract the presser means from said fibrous coating.

30. In combination, in a machine of the class described, a rotary former, means supporting it to revolve bodily in a circular path, means operative to deposit upon the exterior of the former an adherent coating of fibrous material, a carriage movable in an arcuate path adjacent to the path of the former, pressure-applying means mounted on the carriage, means operative to cause the carriage to move with the former at substantially the same angular velocity as the latter while the pressure-applying means is operatively engaged with the adherent coating on the former, and means operative, when the carriage reaches a predetermined point in its path, to move the carriage back in the opposite direction to its initial position.

31. In combination in a machine of the class described a rotary former, means supporting it to revolve bodily in a circular path, means operative to deposit upon the exterior of the former an adherent coating of fibrous material, a carriage movable in an arcuate path which is slightly eccentric to the path of the former and which converges with said latter path, pressure-applying means mounted on the carriage, means operative to cause the carriage to move along its path while the pressure-applying means is operatively engaged with the fibrous coating on the former and, by reason of the convergence of said paths, to exert increasing pressure upon the fibrous coating, and means operative to cause the carriage to return to its initial position after it has moved with the former for a predetermined distance along the path of the latter.

32. In combination in a machine of the class described, a rotary former, means to support it to move bodily in a predetermined path, means operative to deposit upon the exterior of the former an adherent coating of fibrous material, a carriage and pressure-applying means mounted thereon, means guiding the carriage to move from a starting position where the pressure-applying means operatively initially engages the fibrous coating on the former to a terminal point where the pressure-applying means disengages the fibrous coating, the path of the carriage converging with that of the former thereby to cause the pressure-applying means to bear with progressively increasing pressure upon the fibrous coating as the carriage moves along its path, means for moving the carriage at substantially the same angular velocity as the former while the pressure-applying means is in engagement with said fibrous coating, and means operative to return the carriage along its path from its terminal point to its starting position.

33. Apparatus operative to make a wet but self-sustaining hollow body by direct deposition of fibrous material from a fiber-bearing liquid, said apparatus comprising inner and outer foraminous-walled rotatable formers, means operative to create suction at the inside of the inner former thereby to withdraw liquid radially inwardly through the foraminous wall of said inner former, and means operative positively to rotate but one of said formers, the other of said formers being freely rotatable.

34. Apparatus operative to make a wet but self-sustaining embryo textile core, capable of being handled without collapse or substantial deformation, by the direct deposition of fibrous material from a fluid comprising liquid and suspended fibrous material, said apparatus comprising a pair of coaxial rotatable foraminous-walled formers which, when nested one within the other, define an annular chamber whose dimensions substantially equal that of the desired core, means for positively rotating one only of said formers, the other former being free to rotate, and means for establishing subatmospheric pressure at the outside of the outer former and at the inside of the inner former.

EUGENE L. PERRY.